United States Patent
Azure et al.

(10) Patent No.: US 12,516,492 B2
(45) Date of Patent: *Jan. 6, 2026

(54) UTILITY LOADER WITH HIGH LIFT LOADER ARMS AND UNIFYING HAND GRIP FOR DUAL TRACTION CONTROL LEVERS

(71) Applicant: The Toro Company, Bloomington, MN (US)

(72) Inventors: John P. Azure, Bloomington, MN (US); Joseph C. Knipp, Elko, MN (US); David A. Murray, Eagan, MN (US)

(73) Assignee: The Toro Company, Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/793,321

(22) Filed: Aug. 2, 2024

(65) Prior Publication Data
US 2024/0392529 A1   Nov. 28, 2024

Related U.S. Application Data

(60) Continuation of application No. 18/340,218, filed on Jun. 23, 2023, which is a continuation of application
(Continued)

(51) Int. Cl.
*E02F 3/34* (2006.01)
*E02F 3/42* (2006.01)
*E02F 9/20* (2006.01)

(52) U.S. Cl.
CPC ........... *E02F 3/3405* (2013.01); *E02F 3/3417* (2013.01); *E02F 3/422* (2013.01); *E02F 9/2012* (2013.01); *E02F 9/2004* (2013.01)

(58) Field of Classification Search
CPC ........... B62D 1/14; E02F 9/2004; G05G 1/04; G05G 1/06; G05G 9/00; G05G 11/00; G05G 2700/26
(Continued)

(56) References Cited

U.S. PATENT DOCUMENTS

| | | | |
|---|---|---|---|
| 1,808,735 | A | 6/1931 | Henneuse et al. |
| 2,298,450 | A | 10/1942 | Baker |

(Continued)

FOREIGN PATENT DOCUMENTS

| | | |
|---|---|---|
| CN | 203247619 | 10/2013 |
| EP | 2280122 | 2/2011 |

(Continued)

OTHER PUBLICATIONS

ISO 6165, International Standard, Earth-moving machinery—Basic types—Identification and terms and definitions, Sixth edition Sep. 1, 2012, 16 pages.
(Continued)

*Primary Examiner* — Ronald P Jarrett
(74) *Attorney, Agent, or Firm* — Merchant & Gould P.C.

(57) ABSTRACT

A compact utility loader is operated by a standing operator at the rear of a frame. A loader arm assembly comprises a scissors linkage on either side of the frame nesting around the prime mover. Each scissors linkage has an upper loader arm that is pivoted at its rear end to rears ends of a pair of lower loader arms such that the pivot connections to the upper loader arm move upwardly and forwardly relative to the frame during elevation of the loader arm assembly to provide a high lift capability. The frame is self-propelled by a differential drive and steering system that is operated by dual levers. A hand grip extends between and unifies the operation of the levers to permit the operator to more easily
(Continued)

move the levers in the ways that are needed to provide either straight motion of the frame or turns of the frame.

30 Claims, 9 Drawing Sheets

Related U.S. Application Data

No. 17/675,710, filed on Feb. 18, 2022, now Pat. No. 11,702,815, which is a continuation of application No. 16/882,691, filed on May 25, 2020, now Pat. No. 11,255,068, which is a continuation of application No. 16/822,714, filed on Mar. 18, 2020, now Pat. No. 11,111,645, which is a continuation of application No. 16/291,656, filed on Mar. 4, 2019, now Pat. No. 10,597,843, which is a continuation of application No. 15/973,864, filed on May 8, 2018, now Pat. No. 10,221,540, which is a division of application No. 15/047,061, filed on Feb. 18, 2016, now Pat. No. 9,970,176.

(60) Provisional application No. 62/118,854, filed on Feb. 20, 2015.

(58) Field of Classification Search
USPC .......... 180/332, 333, 411; 280/778; 414/1, 4
See application file for complete search history.

(56) References Cited

U.S. PATENT DOCUMENTS

| | | | |
|---|---|---|---|
| 2,345,620 A | 4/1944 | Mork | |
| 2,455,474 A | 12/1948 | Drott et al. | |
| 2,558,928 A | 7/1951 | Bryan et al. | |
| 2,563,277 A | 8/1951 | Roeder et al. | |
| 2,593,500 A | 4/1952 | Thierry | |
| 2,707,059 A | 4/1955 | Gerst | |
| 2,774,496 A | 12/1956 | Dorkins | |
| 2,799,410 A | 7/1957 | Carlson | |
| 2,849,132 A | 8/1958 | Clarke | |
| 3,074,572 A | 1/1963 | Ulinksi | |
| 3,209,930 A | 10/1965 | Deruppe | |
| 3,215,292 A | 11/1965 | Halls | |
| 3,411,647 A | 11/1968 | Zimmerman | |
| 3,586,195 A | 6/1971 | Beltrami | |
| 3,823,791 A | 7/1974 | Sheler | |
| 3,828,873 A | 8/1974 | Oestmann | |
| 3,872,991 A | 3/1975 | Pasideris et al. | |
| 3,908,778 A | 9/1975 | Sien | |
| 3,963,131 A | 6/1976 | Dimmer | |
| 3,995,761 A | 12/1976 | Hurlburt | |
| 4,111,066 A | 9/1978 | Kendrick | |
| 4,186,812 A | 2/1980 | Sutton | |
| 4,558,558 A | 12/1985 | Horner, Jr. et al. | |
| 4,559,844 A * | 12/1985 | Mor | G05G 9/047 137/636.3 |
| 5,169,278 A | 12/1992 | Hoechst et al. | |
| D359,497 S | 6/1995 | Rayner | |
| 5,423,654 A | 6/1995 | Rohrbaugh | |
| 5,470,190 A | 11/1995 | Bamford et al. | |
| 5,488,818 A | 2/1996 | Powers et al. | |
| 5,542,814 A | 8/1996 | Ashcroft et al. | |
| 5,609,464 A | 3/1997 | Moffitt et al. | |
| 5,894,908 A | 4/1999 | Eftefield | |
| 6,058,797 A * | 5/2000 | Konig | G05G 1/06 16/436 |
| D431,574 S | 10/2000 | Porter | |
| 6,132,163 A | 10/2000 | Andrews et al. | |
| 6,205,665 B1 | 3/2001 | Anderson et al. | |
| 6,325,589 B1 | 12/2001 | Jang et al. | |
| 6,397,967 B1 | 6/2002 | McIlwraith | |
| 6,460,640 B1 | 10/2002 | Keagle et al. | |
| 6,474,933 B1 | 11/2002 | Hoechst et al. | |
| 6,575,262 B2 | 6/2003 | Nagatsuka | |
| 6,612,636 B2 | 9/2003 | Arthur et al. | |
| 6,616,398 B2 | 9/2003 | Dershem et al. | |
| 6,695,568 B2 | 2/2004 | Bares et al. | |
| 6,698,114 B2 | 3/2004 | Bares et al. | |
| 6,823,562 B1 * | 11/2004 | Smith | B25G 1/06 16/DIG. 12 |
| 6,830,111 B2 | 12/2004 | Page | |
| 6,832,659 B1 | 12/2004 | Bares et al. | |
| 6,866,466 B2 | 3/2005 | Roan et al. | |
| 6,902,016 B2 | 6/2005 | Bares et al. | |
| 7,059,434 B2 * | 6/2006 | Bares | E02F 9/2004 180/9.1 |
| 7,214,026 B2 | 5/2007 | Hilvers et al. | |
| 7,264,435 B2 | 9/2007 | Layko et al. | |
| 7,426,976 B2 | 9/2008 | Edlin | |
| 7,549,500 B2 | 6/2009 | Graham et al. | |
| 7,650,960 B2 | 1/2010 | Bock | |
| 7,793,979 B2 | 9/2010 | Kraimer et al. | |
| 7,805,864 B2 | 10/2010 | Azure et al. | |
| 7,866,700 B2 | 1/2011 | Weibling et al. | |
| D631,898 S | 2/2011 | Major et al. | |
| 7,980,569 B2 | 7/2011 | Azure et al. | |
| 8,016,065 B2 | 9/2011 | Osborn et al. | |
| 8,037,952 B2 | 10/2011 | Bock | |
| 8,047,310 B2 | 11/2011 | Kallevig | |
| 8,109,356 B2 | 2/2012 | Brock et al. | |
| 8,152,433 B2 | 4/2012 | Yamada et al. | |
| 8,545,163 B2 | 10/2013 | Yasuda et al. | |
| 8,821,104 B2 | 9/2014 | Yasuda et al. | |
| 9,017,005 B2 | 4/2015 | Martin et al. | |
| 9,045,882 B2 | 6/2015 | Major et al. | |
| 9,321,386 B1 | 4/2016 | Thomas et al. | |
| D803,273 S | 11/2017 | Sewell | |
| 9,970,176 B2 | 5/2018 | Azure et al. | |
| 10,221,540 B2 | 3/2019 | Azure et al. | |
| 10,597,843 B2 | 3/2020 | Azure | |
| 11,111,645 B2 | 9/2021 | Azure et al. | |
| 11,255,068 B2 | 2/2022 | Azure et al. | |
| 11,702,815 B2 | 7/2023 | Azure et al. | |
| 2003/0095857 A1 | 5/2003 | Degelman | |
| 2004/0146389 A1 | 7/2004 | Bares et al. | |
| 2005/0036876 A1 | 2/2005 | Walto et al. | |
| 2006/0245895 A1 | 11/2006 | Horst et al. | |
| 2007/0128012 A1 | 6/2007 | Yamada et al. | |
| 2007/0132204 A1 | 6/2007 | Sewell | |
| 2008/0197588 A1 | 8/2008 | Azure et al. | |
| 2009/0116943 A1 | 5/2009 | Valere | |
| 2010/0168933 A1 | 7/2010 | Rorabaugh | |
| 2010/0183412 A1 | 7/2010 | Borntrager et al. | |
| 2010/0289233 A1 | 11/2010 | Kallevig et al. | |
| 2011/0137491 A1 | 6/2011 | Self et al. | |
| 2012/0189418 A1 | 7/2012 | Husson et al. | |
| 2012/0291319 A1 | 11/2012 | Jones | |
| 2012/0305025 A1 | 12/2012 | Helbig et al. | |
| 2014/0212254 A1 | 7/2014 | Martin et al. | |
| 2014/0271078 A1 | 9/2014 | Koch | |
| 2015/0098785 A1 | 4/2015 | Oyama et al. | |
| 2016/0152262 A1 | 6/2016 | Laurin et al. | |

FOREIGN PATENT DOCUMENTS

| | | |
|---|---|---|
| FR | 873065 | 9/1961 |
| FR | 1316493 | 2/1963 |
| FR | 2209015 | 6/1974 |
| GB | 832800 | 4/1960 |
| GB | 947803 | 1/1964 |
| GB | 960188 | 6/1964 |
| GB | 2368573 | 5/2002 |
| JP | 63265022 | 11/1988 |
| JP | 11140900 | 5/1999 |
| JP | 2004-17705 | 1/2004 |
| JP | 2006307498 | 11/2006 |
| KR | 200443753 | 8/2008 |
| KR | 20080003426 | 8/2008 |

(56) References Cited

FOREIGN PATENT DOCUMENTS

| | | |
|---|---|---|
| KR | 10-1023528 | 3/2011 |
| KR | 10-1041996 | 6/2011 |

OTHER PUBLICATIONS

ISO 3457, International Standard, Earth-moving machinery—Guards—Definitions and requirements, Fourth edition May 15, 2003, 18 pages.
ISO 3411, International Standard, Earth-moving machinery—Physical dimensions of operators and minimum operator space envelope, Fourth edition Jul. 15, 2007, 18 pages.
Sclater et al., Mechanisms and Mechanical Devices Sourcebook, Fourth Edition, 71 pages.
Nariman-Zadeh, N. et. al., Mechanism and Machine Theory 44, Pareto optimal synthesis of four-bar mechanism for path generation, Mar. 26, 2008, pp. 180-191.
Hartenberg, Richard S. et. al., McGraw-Hill, Series in Mechanical Engineering, Kinematic Synthesis of Linkages, 59 pages.
Nolle, H., Mechanism and Machine Theory, Linkage Coupler Curve Syntheseis: A Historical Review—II. Developments after 1875*, vol. 9, pp. 325-348, 1974.
Lee, Wen-Tzong et al., Inverse Problems in Science and Engineering, Developments in quantitative dimentional synthesis, 1970-present: four-bar path and function generation, vol. 26, No. 9, Oct. 30, 2017, 26 pages.
Uicker, John J., Jr., et al., Theory of Machines and Mechanisms, Fifth Edition, Oxford University Press, 2017, 131 pages.
Alamo Group Inc., "Bush Hog BH10 Series, Operator's Manual," dated 2013, 140 pages.
Bobcat Company, "MT52 Mini Track Loader Specifications", dated 2010, 4 pages.
Bobcat Company, "MT 52 Mini Track Loader" brochure, dated 2005, retrieved from: http://web.archive.org/web./20050305182847/http:/www.bobcat.com/products/mtl/pdf/b-1776_mt52_lit_1203.pdf.
Compact Equipment, "Implements of Construction" article, dated Jun. 17, 2011, 8 pgs.
Construction Shows, "Case Upgrades its Skid Steer and Compact Tracked Loader Line-Up" article, dated May 16, 2014, 8 pgs.
Farm Safety Association, "Farm Tractor Safety: A Guide to Safe Farm Tractor Operation," dated 2009, 26 pages.
For Construction Pros.com, Curt Bennink, "Size-Up Skid Steer Loaders" article, dated Mar. 15, 2006, 5 pgs.
GTC, "Learning Materials, Level 2, Prepare and operate a tractor with attachments," 2010, 24 pages.
Health and Safety Authority, "Guidance on the Safe Use of Tractors and Machinery on Farms," dated 2015, 108 pages.
JCB, "Skid Steer and Compact Track Loader Brochure", 2009, 24pgs.
Lanz-Bulldog, Photograph of Derruppe DB5, admitted prior art.
Mustang Manufacturings Company Inc., "Mustang Skid Steer Loader—Radial and Vertical Lift" brochure, dated 2014.
Plowsite.com, "Bobcat Weight Kit" chat forum dialogue, dated 2001, 2 pgs.
Ramrod Equipment, "Ramrod Compact Mini Skid Loader Solutions" newsletter, dated Oct. 2016, 4 pgs.
SAE International, "Surface Vehicle Recommended Practice, Personnel Protection-Compact Tool Carriers", SAE J2752, issued Jun. 2010. 12 pgs.
The Toro Company, "Dingo 322 Compact Utility Loader, Parts Catalog", dated 1999, 32 pgs.
The Toro Company, "Dingo 322 Operator's Manual", dated 2000.
The Toro Company, "Dingo 322 Compact Utility Loader, Service Manual", dated 2012, 602 pgs. (submitted in three parts).
The Toro Company, "Dingo Compact Utility Loaders" Brochure, dated 2016, 20 pgs.
The Toro Company, "Dingo TX413 Compact Utility Loader, Operator's Manual", dated 2004, 40pgs.
The Toro Company, "Dingo TX413 Compact Utility Loader, Parts Catalog", dated 2004, 40 Pgs.
The Toro Company, "TX427 Parts Catalog", 2010.
The Toro Company, "Solution Alternatives" Presentation, dated Apr. 17, 2013, 1 pg.
The Toro Company, "Toro Rental Bulletin re Toro Dingo TX 1000 Introduction", dated Feb. 10, 2015, 5 pgs.
TP Hardware, Photographs of Derruppe DB5, admitted prior art.
Tramac Deruppe, "DB5 Brochure", Mid 1960's.
Vermeer Manufacturing Company, "CTX50 Machine Serial No. 10VR2070L5F1000105 Sales Information", dated Apr. 8, 2015, 3 pgs.
Vermeer Manufacturing Company, "CTX50 Machine Serial No. 10VR2070L5F1000106 Sales Information", dated Jan. 29, 2015, 3 pgs.
Vermeer Manufacturing Company, "CTX50 Machine Serial No. 1VR2070LXF1000103 Sales Information", dated Dec. 10, 2014, 3 pgs.
Vermeer Manufacturing Company, "CTX50 Mini Skid Steer" Spec Sheet, dated 2015.
Vermeer Manufacturing Company, "CTX50 Mini Skid Steer" spec sheet, dated 2016, 2 pgs.
Vermeer Manufacturing Company, Photographs of CTX50 Machines with VIN Numbers. Exhibit 1007.
Vermeer Manufacturing Company, Screen Shot Compilation of "Vermeer CTX50 Mini Skid Steer" YouTube video found at https://www/youtube.com/watch?v+JYZckHbLF8k, dated Feb. 9, 2015.
Vermeer Manufacturing Company, "S450TX Mini Skid Steer" Spec Sheet, dated 2013.
Vermeer Manufacturing Company, "S450TX Mini Skid Steer Parts Manual", dated 2012-2013, 8 pages.
Vermeer Manufacturing Company, "Vermeer Mini Skid Steers S600TX" brochure, dated 2005.
Vermeer Manufacturing Company, "Vermeer Mini Skid Steers S600/S600TX" brochure, dated 2010.
Vermeer Manufacturing Company, "Vermeer Mini Skid Steers S650TX" brochure, dated 2011.
Vermeer Manufacturing Company, "S800TX Mini Skid Steer" brochure, dated 2009.
Vermeer Manufacturing Company, "S800TX Mini Skid Steer" brochure, dated 2013.
Vermeer Manufacturing Company, "Vermeer Has Launched the Newest Mini Skid Steer, the CTX100", dated 2016, 2 pgs.
Vermeer Manufacturing Company, "Various Sizes of Cubic Yard Dumpsters," Exhibit 1025, 12 pgs.
Vermeer Manufacturing Company, "Petition for Post Grant review of U.S. Pat. No. 10,597,843" directed to claims 16-19 of the '843 patent, Aug. 27, 2020, pending as Case PGR2020-00081.
Vermeer Manufacturing Company, "Response" in Reexamination Control No. 90/014,269, dated Mar. 6, 2019. See Section C1a and C1b, pp. 10-19.
US Patent and Trademark Office, "Non-Final Office Action" in Reexamination Control No. 90/014,269, dated Dec. 6, 2019. See Ground 5.
US Patent and Trademark Office, "Non-Final Office Action" in Reexamination Control No. 90/014,269, dated May 28, 2020. See the repeated Ground 5 and the Examiner's Response to the Ground 5 Patent owner Arguments on pp. 27-29.

\* cited by examiner

UTILITY LOADER WITH HIGH LIFT LOADER ARMS AND UNIFYING HAND GRIP FOR DUAL TRACTION CONTROL LEVERS

CROSS REFERENCE TO RELATED APPLICATIONS

This application is a continuation of application Ser. No. 18/340,218, filed Jun. 23, 2023; is a continuation of application Ser. No. 17/675,710, filed Feb. 18, 2022, now U.S. Pat. No. 11,702,815; which is a continuation of application Ser. No. 16/882,691, filed May 25, 2020, now U.S. Pat. No. 11,255,068; which is a continuation of application Ser. No. 16/822,714, filed Mar. 18, 2020, now U.S. Pat. No. 11,111,645; which is a continuation of application Ser. No. 16/291,656, filed Mar. 4, 2019, now U.S. Pat. No. 10,597,843; which is a continuation of application Ser. No. 15/973,864, filed May 8, 2018, now U.S. Pat. No. 10,221,540; which is a divisional of application Ser. No. 15/047,061, filed Feb. 18, 2016, now U.S. Pat. No. 9,970,176; which claims the benefit of provisional application Ser. No. 62/118,854, filed Feb. 20, 2015, which applications are incorporated herein by reference in their entirety.

TECHNICAL FIELD

This invention relates to a compact utility loader for performing various outdoor maintenance or working operations.

BACKGROUND OF THE INVENTION

Compact utility loaders are well known for performing various types of work in an outdoor environment. Such utility loaders perform work of the type often done by skid steer loaders, but are considerably smaller than skid steer loaders. Such compact utility loaders do not generally carry an operator in a seated position on the loader as do skid steer loaders. Instead, compact utility loaders most often are operated by an operator who walks on the ground behind the loader or, in some cases, who stands on a platform at the rear of the loader.

Compact utility loaders employ a differential or skid steer drive and steering system in which drive members on opposite sides of the loader, i.e. wheels or tracks, are driven at different speeds and/or opposite directions. When the drive members are driven at different speeds and in the same direction, the loader will execute a turn towards the side having the slowest drive member. When the drive members are driven at the same speed but in opposite directions, the loader will execute a very sharp spin or zero radius turn about a vertical axis located between the drive members. This is accomplished using independent traction drives, often individual hydrostatic drives, to independently power the drive members on the opposite sides of the loader.

Dual levers have long been used on compact utility loaders to independently control the traction drives on opposite sides of the loader. These traction control levers are pivotal in fore-and-aft directions from a neutral position in which the traction drives are unpowered and the loader is stationary. If the levers are equally pushed forwardly from neutral, then the loader will move forwardly in a straight line at a speed determined by how far the levers have been pushed ahead of the neutral position. If the levers are equally pulled rearwardly from neutral, then the loader will move rearwardly in a straight line at a speed determined by how far the levers have been pulled behind the neutral position. The levers are placed side-by-side on a compact utility loader to be capable of being operated by one hand of the operator since the other hand of the operator is often needed for operating other controls on the loader.

To make a left turn when traveling forwardly, the operator has to nudge or feather the right hand lever further away from neutral than the left hand lever whose position is either unchanged or is even moved back towards neutral by feathering both levers at the same time. This causes a left turn as the speed of the right hand traction drive is increased while the speed of the left hand traction drive either remains the same or is slowed. The controls are operated the same way to make a right hand except that it is the left hand lever that is moved further away from neutral than the right hand lever. The same differential movement between the traction control levers is also used to make turns when the loader is being propelled in reverse, i.e. the lever controlling the drive on the inside of the turn is moved back towards neutral or remains unchanged while the lever controlling the drive on the outside of the turn is moved further away from neutral.

The traction control levers on compact utility loaders are often topped by at least partially spherical balls or knobs such that they resemble joysticks. However, each such control lever only moves fore and aft along a single longitudinal axis of motion rather than along two orthogonal axes as would a true joystick. Even when the control levers are placed directly side by side such that the operator can rest a single hand on the dual knobs when operating the control levers, it is somewhat challenging for an operator to learn or master the art of nudging or feathering one control lever ahead of or behind the other lever to accomplish differential steering. This is particularly true given the uneven terrain on which a loader may be operating and the consequent jostling or rocking of the loader during operation. Accordingly, it would be an advance in the art to provide an operator with a better way of manipulating such dual lever traction controls on a compact utility loader.

Finally, the vertical reach of the loader arms on compact utility loaders is somewhat limited. While high lift loader arms are known on full size skid steer loaders as disclosed in U.S. Pat. No. 5,542,814, the use of such high lift loader arms on a compact utility loader has been considered difficult if not impossible due to size and durability constraints. Accordingly, it would be a further advance in the art to provide a way of safely and durably providing high lift loader arms on compact utility loaders to extend the vertical reach of such loaders. For example, this would allow a compact utility loader to dump debris or materials at higher elevations than previously, thus allowing the use of larger trucks to accept such debris or materials for transport.

SUMMARY OF THE INVENTION

One aspect of this invention relates to a compact utility loader which comprises a frame carrying a prime mover. Ground engaging members are provided on opposite sides of the frame with at least one ground engaging member on each side of the frame being powered to self-propel the frame. A control console is located at a rear end of the frame carrying controls that are manipulated to operate the loader by a standing operator. A loader arm assembly has a pair of scissor linkages on opposite sides of the frame outboard of the prime mover with the linkages nesting around the prime mover when the loader arm assembly is in a lowermost, fully retracted position. Each scissor linkage comprises an upper loader arm having a front end and a rear end and first and second lower loader arms with each lower loader arm also having a front end and a rear end. The front ends of the lower loader arms are pivotally connected to a front support assembly that is fixed to a front portion of the frame. The rear ends of the lower loader arms are pivotally connected by separate pivots to the rear end of the upper loader arm with the rear end of the upper loader arm being free to move upwardly and forwardly relative to the frame as the upper loader arm scissors away from the lower loader arms as the loader arm assembly is elevated between the lowermost, fully retracted position thereof and an uppermost, fully extended position. Finally, an outdoor work operation tool or implement is pivotally carried on the front ends of the upper loader arms ahead of a front end of the frame.

Another aspect of this invention relates to an outdoor work vehicle which comprises a frame having an outdoor maintenance or work implement carried on the frame. A differential drive and steering system is carried on the frame, wherein the drive and steering system comprises independent traction drives on opposite sides of the frame. Dual levers are carried on the frame to independently control the traction drives on the opposite sides of the frame. The levers are equally pivoted in fore-and-aft directions from a neutral position to cause straight motion of the frame with the levers being unequally pivoted in fore-and-aft directions from the neutral position to cause turning motion of the frame. A hand grip extends between and unites the levers for causing conjoint motion of the levers through motion of the hand grip in the following manner. Motion of the hand grip along a fore-and-aft axis with the hand grip being perpendicular to the fore-and-aft axis results in the levers being equally pivoted to produce the straight motion of the frame. Motion of the hand grip along the fore-and-aft axis with the hand grip being cocked to one side of the fore-and-aft axis results in the levers being unequally pivoted to produce the turning motion of the frame towards the one side to which the hand grip is cocked.

BRIEF DESCRIPTION OF THE DRAWINGS

This invention will be described more specifically in the following Detailed Description, when taken in conjunction with the following drawings, in which like reference numerals refer to like elements throughout.

DETAILED DESCRIPTION

Figure 1:
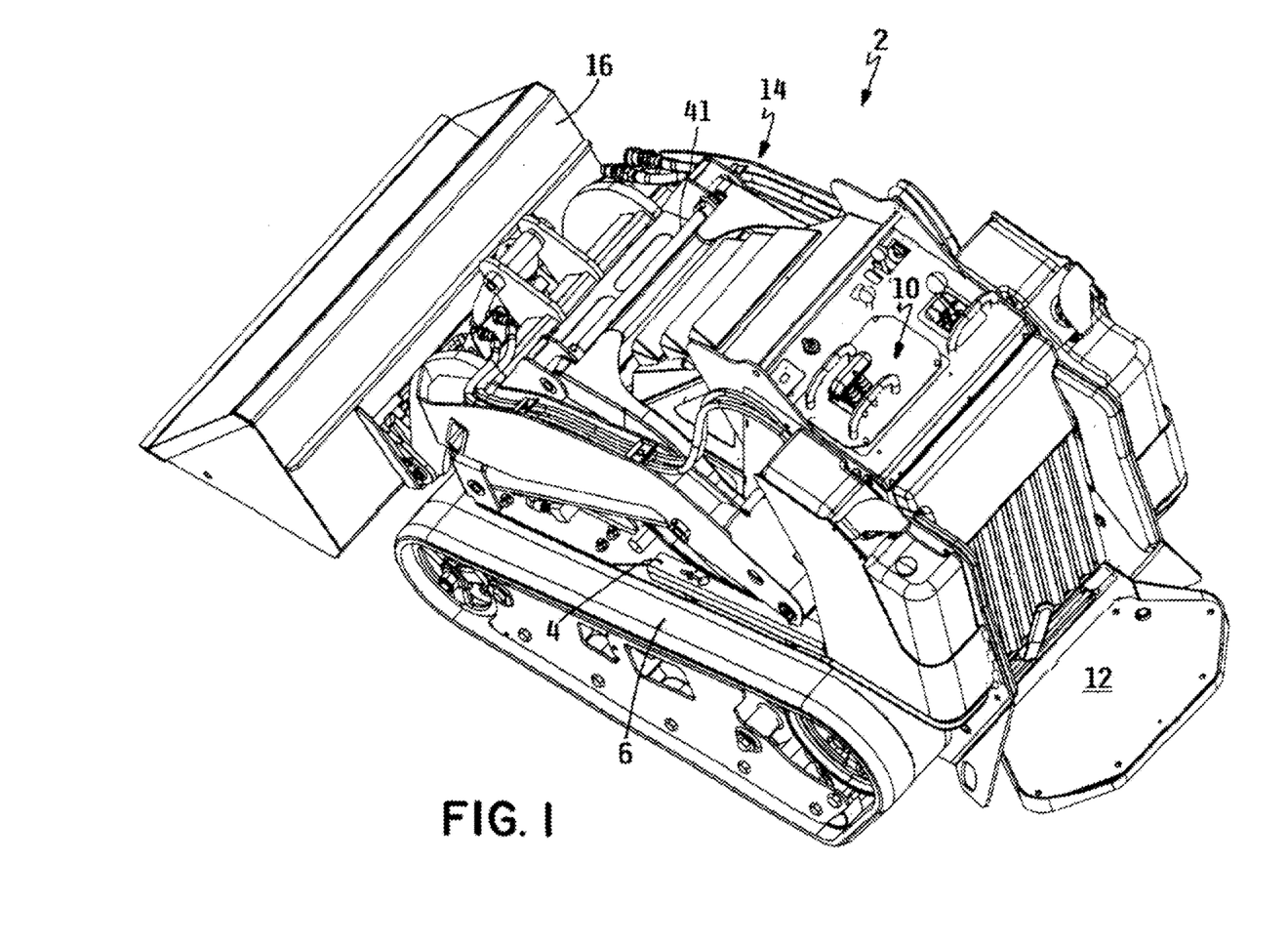
FIG. 1 is a perspective view of a compact utility loader according to this invention.
Figure 2:
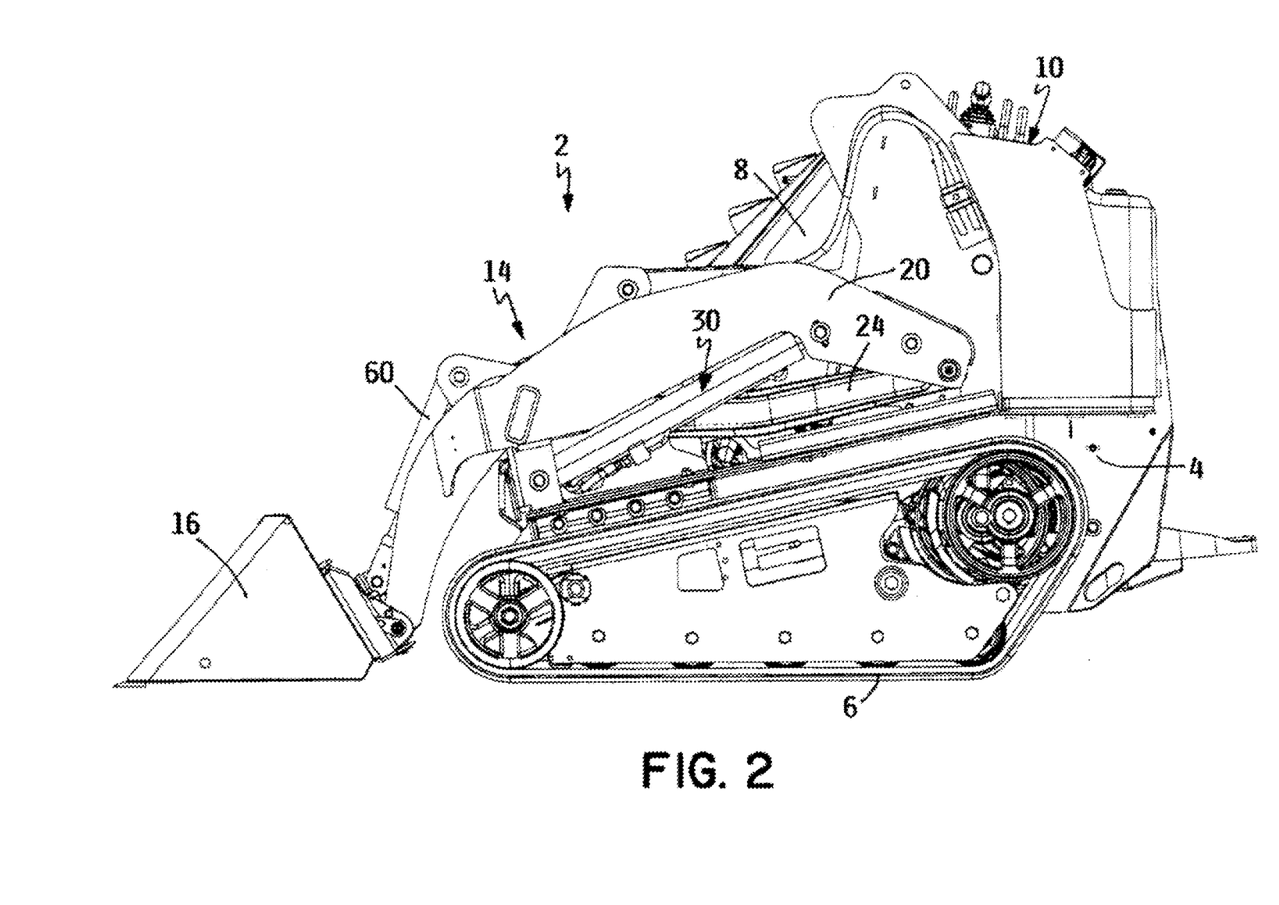
FIG. 2 is a side elevational view of the loader of FIG. 1, particularly illustrating the high lift loader arms in their lowermost, fully retracted position.

Referring first to FIGS. 1 and 2, one embodiment of a compact utility loader according to this invention is illustrated generally as 2. Loader 2 comprises a small chassis or frame 4 that mounts a pair of driven, ground engaging endless tracks 6 on opposite sides thereof. Tracks 6 may be replaced by pairs of driven ground engaging wheels on opposite sides of frame 4 if so desired.

Whether the ground engaging traction members of loader 2 are endless tracks or wheels, they are powered by a prime mover 8, such as but not limited to an internal combustion gasoline or diesel engine, which is carried on frame 4. Prime mover 8 is located substantially over a central portion of frame 4 immediately ahead of an operator's control console 10 located at the rear of frame 4. Control console 10 is directly in front of a foot platform 12 that allows the operator to ride on loader 2 in a standing position at the rear of loader 2. Alternatively, the foot platform 12 may be deleted from loader 2 if so desired in which case the operator would walk on the ground behind loader 2 rather than riding on loader 2. In this alternative walk behind configuration control console 10 would be located at a convenient height relative to the ground to allow the controls to be easily reached by an operator who walks on the ground behind loader 2 rather than riding on an elevated foot platform. Loaders 2 of the general type shown herein are manufactured and sold by The Toro Company, in both wheeled and tracked versions as well as ride on and walk behind versions, under the Dingo® brand name.

Loader 2 has a loader arm assembly 14 that in a lowermost, fully retracted position nests around prime mover 8 as shown in FIG. 2. A tool or implement for performing some type of outdoor maintenance or work operation is carried on the front end of loader 2 arm assembly in advance of frame 4 of loader 2. In the embodiment of loader 2 shown herein, the implement comprises a pivotal dump bucket 16 for scooping up dirt, mulch or other materials and for then subsequently dumping the materials at another location, such as into a dump truck. Many other outdoor maintenance or work implements, such as trenchers, augers, chippers, fork lifts, etc., could be interchangeably used on the front end of loader arm assembly 14 in place of dump bucket 16.

Figure 3:
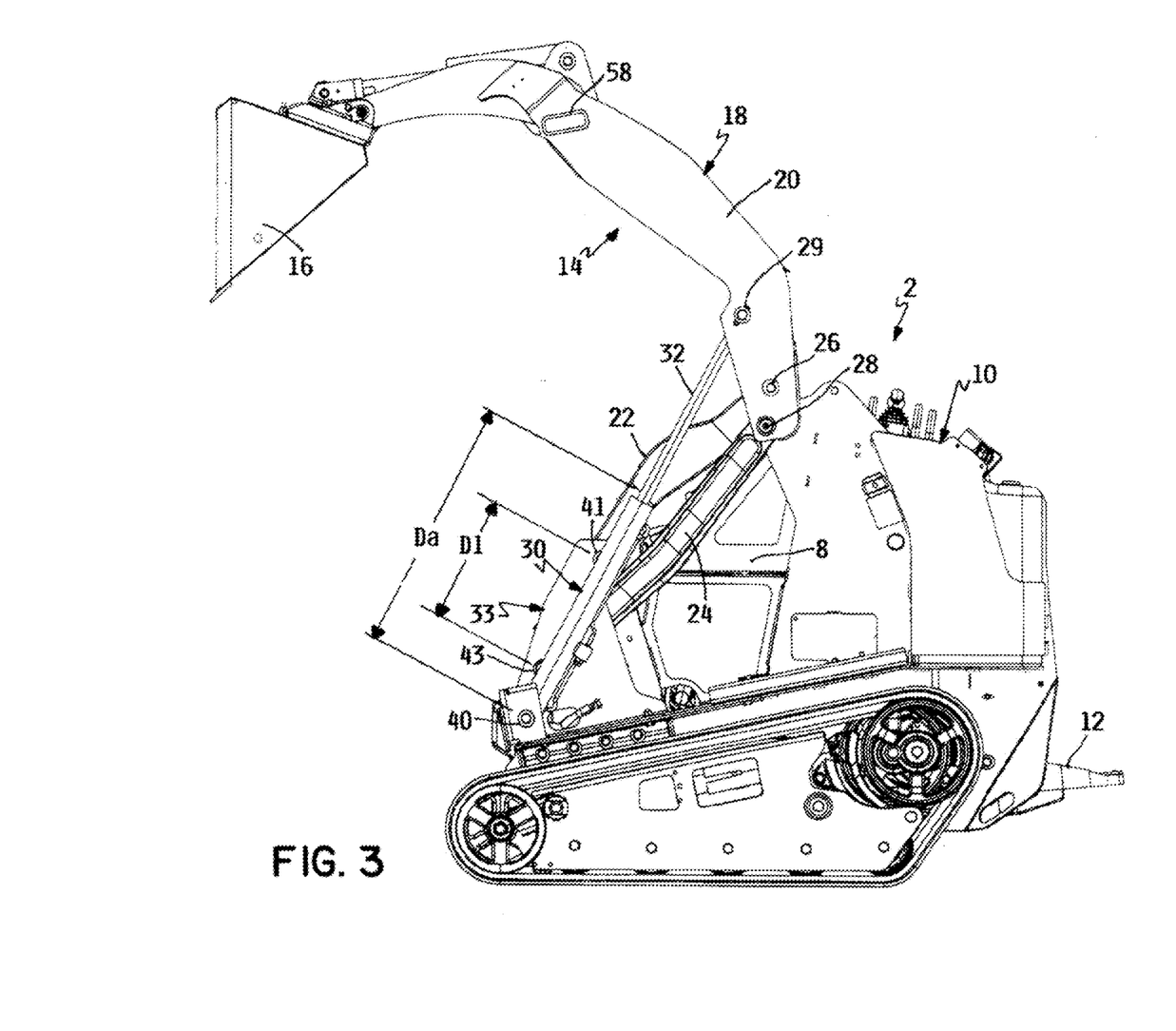
FIG. 3 is a side elevational view similar to FIG. 2, particularly illustrating the high lift loader arms in their uppermost, fully extended position.

An aspect of this invention is the use of a high lift loader arm assembly that accommodates the small form of loader 2. Referring now to FIG. 3, loader arm assembly 14 comprises a pair of scissor shaped loader arm linkages 18 positioned on opposite sides of loader frame 4 directly outboard of prime mover 8. Linkages 18 are identical to one another so a description of one linkage 18 will suffice to describe the other. FIG. 3 illustrates linkage 18 in the uppermost, fully extended, high lift position of loader arm assembly 14. In this position, dump bucket 16 has been elevated a considerable distance above the ground.

As shown in FIG. 3, each linkage 18 comprises an upper loader arm 20 and two lower loader arms 22, 24 that are pivotally connected by pivots 26, 28 to the rear portion of upper loader arm 20. A hydraulic cylinder 30 has its piston rod 32 pivotally connected to upper loader arm 20 somewhat forwardly of pivots 26, 28 for lower loader arms 22, 24. Hydraulic cylinder 30 is the actuator that lifts and lowers loader arm assembly 14 between its FIG. 2 and FIG. 3 positions and any desired position in between. Other actuators, such as electrical actuators, could be used in placed of hydraulic cylinders 30 used in linkages 18.

Pivots 26, 28 in each linkage 18 are not attached to loader frame 4, but only serve to pivotally connect the two lower loader arms 22, 24 to upper loader arm 20. This permits the rear end of linkage 18 to elevate and move forwardly as loader arm assembly 14 is elevated by hydraulic cylinder 30. Compare FIG. 2 to FIG. 3. In FIG. 2, loader arm pivots 26, 28 are low and rearwardly located relative to loader frame 4. In the high lift position of FIG. 3, loader arm pivots 26, 28 have significantly risen and moved somewhat more forwardly than the position they occupied in FIG. 2. It is this ability of linkages 18 to elevate and move forwardly as upper loader arm 20 scissors away from lower loader arms 22, 24 that provides the high lift function.

Figure 4:
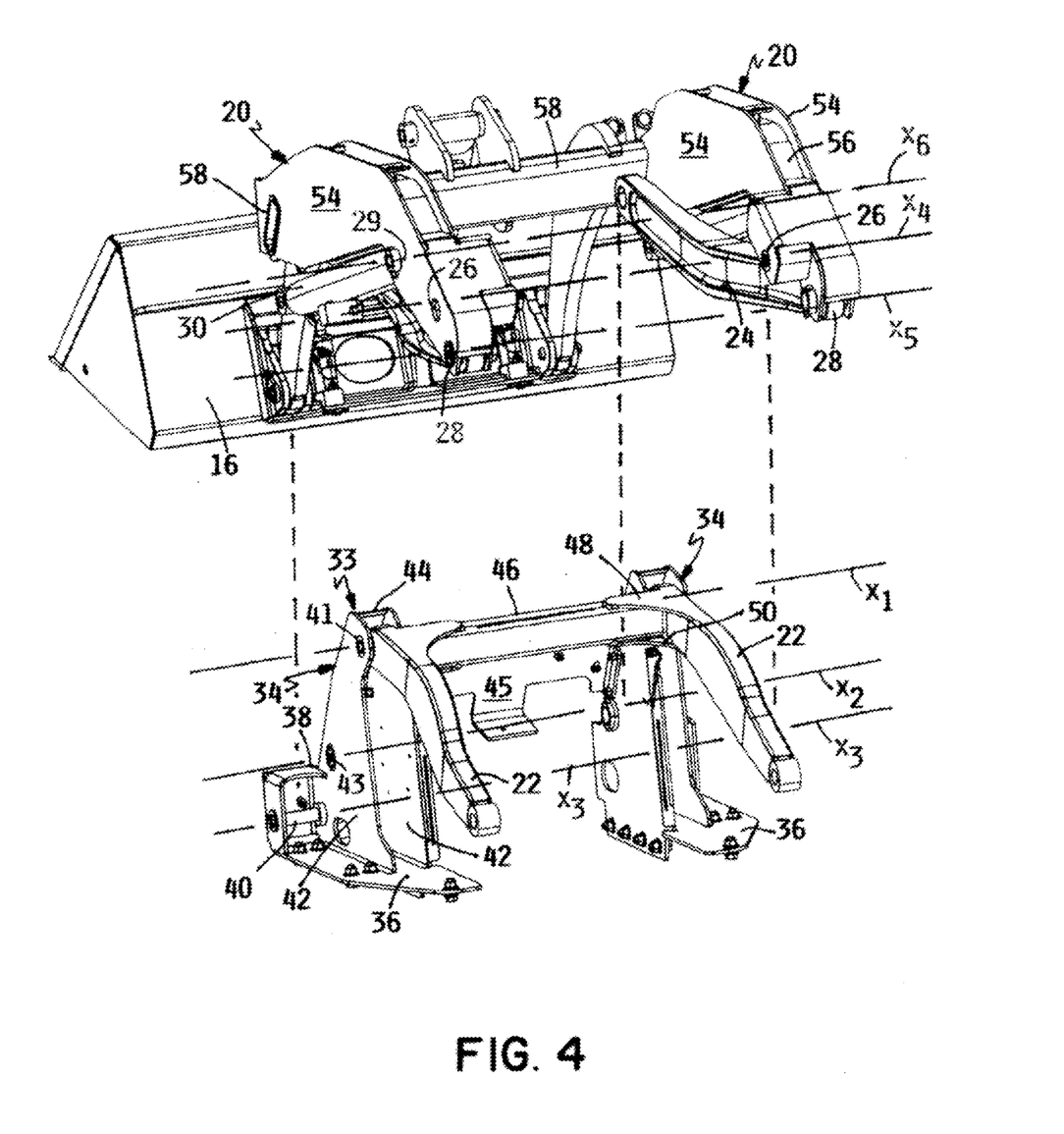
FIG. 4 is an exploded perspective view of various portions of the high lift loader arm assembly of the loader of FIG. 1.

Loader arm assembly 14 of this invention has sufficient strength to provide high lift even when elevating a fully loaded dump bucket to significantly higher distances above the ground than is typical for a normal loader arm assembly. Referring now to FIG. 4, loader arm assembly 14 includes a squat, robust support assembly 33 that is fixed to loader frame 4 generally at the front of frame 4 and which nests around the front of prime mover 8. Support assembly 33 includes spaced left and right U-shaped support beams 34 that are fixed to loader frame 4 by mounting plates 36. Each mounting plate 36 carries outboard of its support beam 34 an enclosed pocket 38 that is open towards the rear and carries a pivot pin 40 therein. Pivot pins 40 in pockets 38 pivotally journal the base ends of hydraulic cylinders 30 used for lifting and lowering linkages 18.

Referring further to FIG. 4, each support beam 34 comprises spaced side walls 42 connected together by a front wall 44 to provide strength. The rear ends of support beams 34 are open for receiving therebetween and pivotally mounting the front ends of the two lower loader arms 22, 24. Support beams 34 are united by a top cross rod 42 shown in FIG. 1 and by a partial front cross wall 45 shown in FIG. 4. The ends of cross rod 42 extend into the interior of the tops of support beams 34 and pivotally journal the front ends of lower loader arms 22 for rotation about the horizontal axis x1. The front ends of the other pair of lower loader arms 24 also extend into the interior of support beams 34 and are pivotally journalled therein for rotation about the horizontal axis x2.

In addition to the strength provided by support assembly 33, the lower loader 22 arms that pivot around axis x1 comprises cast steel arms that are welded to a rectangular cross beam 46. Top and bottom gussets 48 and 50 are further welded between the front ends of lower loader arms 22 and the tops and bottoms of cross beam 46 at each end thereof. This provides very high strength to the pair of lower loader arms 22 particularly given the mounting of lower loader arms 22 inside the U-shaped support beams 34 of support assembly 33. Moreover, the other pair of lower loader arms 24 also comprises cast steel arms and also pivotally mounts inside the U-shaped support beams 34 of support assembly 33 to pivot around axis x2 in FIG. 4. Note that the other pair of lower loader arms 24 is not shown connected in FIG. 4 to support assembly 33, but have bores 52 at the front ends thereof that would be pivotally journalled on pivot pins (not shown) provided in support beams 34 on axis x2.

Looking at the exploded portion of loader arm assembly 14 that is shown in FIG. 4 above the fixed support assembly 33, it can be seen that upper loader arms 20 also have a box-shaped beam configuration formed by side walls 54 connected together by a top wall 56. The bottom of each upper loader arm 20 is open to receive therein the end of piston rod 32 and the rear ends of lower loader arms 22, 24 for pivotal attachment thereto. The strength of upper loader arms 20 is increased by a rectangular box beam 58 of substantial size that connects upper loader arms 20 towards the front thereof. This box beam also serves to mount a hydraulic cylinder 60 that pivots dump bucket 16 at the front of upper loader arms 20.

Figure 5:
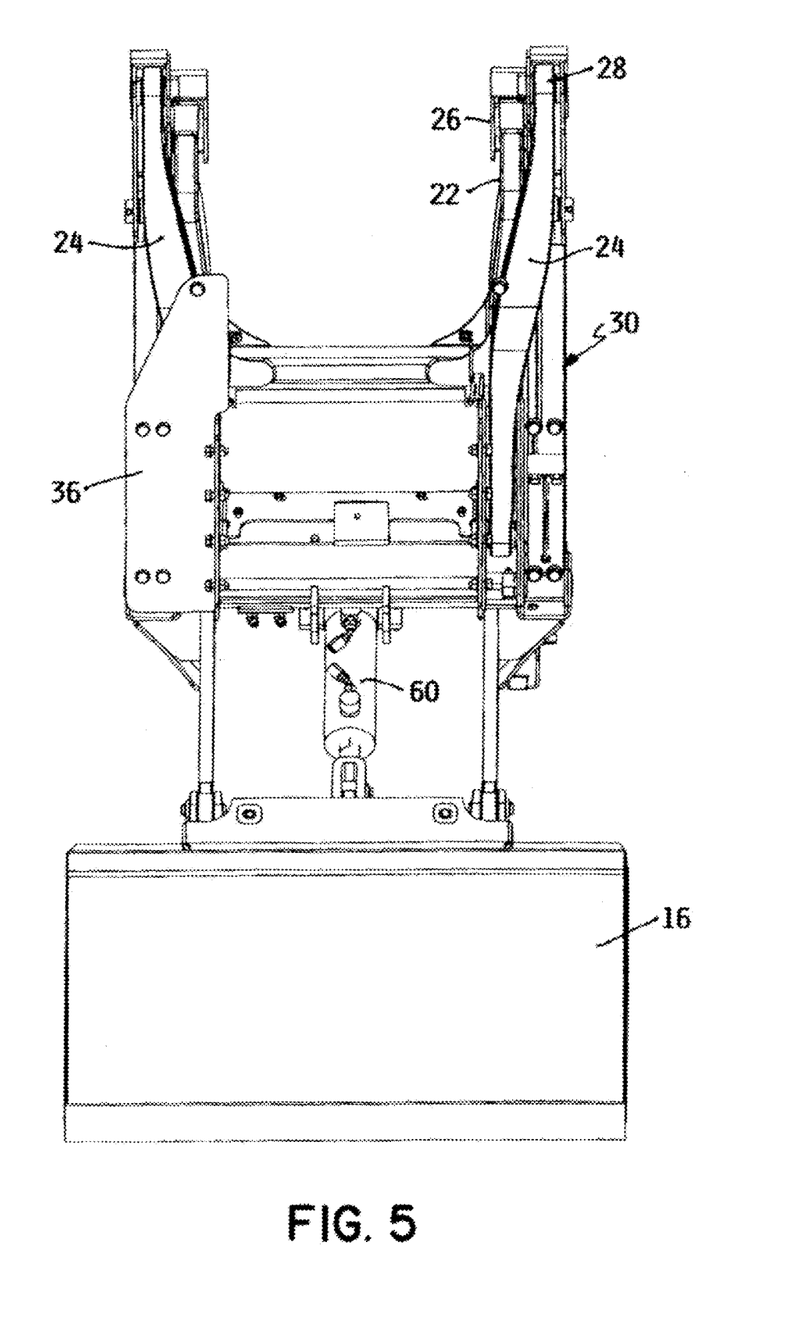
FIG. 5 is a bottom plan view of the portions of the high lift loader arm assembly shown in FIG. 4, particularly illustrating the loader arm assembly portions in an assembled condition with one mounting plate thereof having been removed for the purpose of clarity.

Together, the configuration of support assembly 33, the configuration of the pairs of lower loader arms 22, 24 and how they are pivotally journalled at their front ends inside the U-shaped support beams 34 of support assembly 33 and at their rear ends inside the U-shaped upper loader arms 20, and the box shaped beam configuration used to form upper loader arms 20 along with box beam 58 that unites such loader arms 20, provide a loader arm assembly 14 having sufficient strength and durability to withstand the loads and stresses involved in high lift operations of heavy loads. This is all accomplished in a loader arm assembly 14 that neatly and compactly nests around prime mover 8 in its lowermost, fully retracted position shown in FIG. 2. In this regard, hydraulic cylinders 30 extend straight rearwardly as they connect between the side pockets 38 of support assembly 33 and the undersides of upper loader arms 20. To avoid hitting or interfering with such hydraulic cylinders 30, the lower of the two pairs of lower loader arms, namely loader arms 24 that pivot about the axis x2, are curved to the side to miss hydraulic cylinders 30 as best shown in FIG. 5. Thus, loader arm assembly 14 is well adapted to the loads it must carry during high lift operations while being tailored to the small form of a compact utility loader 2. In addition, high lift loader arm assembly 14 maintains the forward reach of the loader arms 20 and dump bucket 16 carried thereon far better than radial loader arms which move somewhat rearwardly as they rise.

Turning now to FIGS. 6-13, another aspect of this invention relates to the traction control levers 62 that cause differential and spin steering of the traction drive of loader 2. As is well known in skid steer and compact utility loaders, individual drives, such as but not limited to hydrostatic drives, are provided on each side of loader 2 to effect both propulsion and steering of loader 2. This is done by differentially actuating the drives to each side of loader 2, namely causing one drive to rotate faster than the other, to create turns to the side of the slowest drive. Spin or zero radius turns are accomplished by causing one drive to rotate forwardly at a given speed while causing the other drive to rotate rearwardly at approximately the same speed. As noted above, such differential drives are in themselves well known for use on compact utility loaders.

Figure 7:
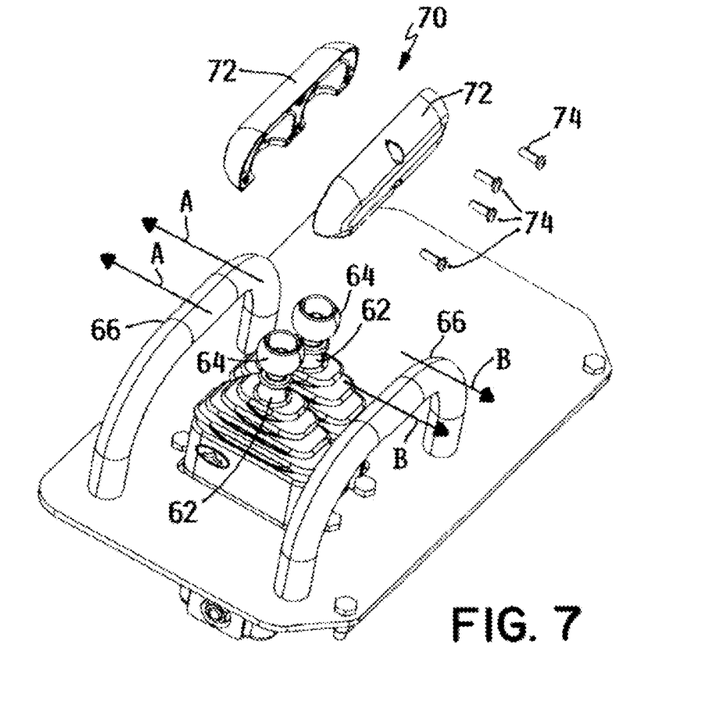
FIG. 7 is a perspective view similar to FIG. 6, but showing the hand grip in an exploded and disassembled form relative to the traction control levers.

As best seen in FIG. 7, known differential drives are often controlled by the operator by using side-by-side control levers 62 that may be operated along fore and aft axes to be pushed forwardly out of neutral or pulled rearwardly out of neutral. Levers 62 often have a partially spherical ball or knob 64 on the top thereof. Levers 62 are shown in neutral in FIG. 7. When they are pushed forwardly as indicated by the arrows A in FIG. 7, loader 2 is propelled forwardly. When they are pulled rearwardly as indicated by the arrows B in FIG. 7, loader 2 is propelled in reverse. If levers 62 are advanced or retarded unequally as they are pushed forwardly or pulled rearwardly, this differential action between levers 62 causes turns to one side. The operator normally rests one hand on such levers 62 when driving loader 2 and uses the fingers of his or her hand to feather one lever 62 more forward or rearward of the other lever 62 when turning. Grab bars 66 are provided in front of and in back of levers 62 for allowing the user to rest portions of his or her hand or fingers on grab bars 66 when operating levers 62.

Figure 6:
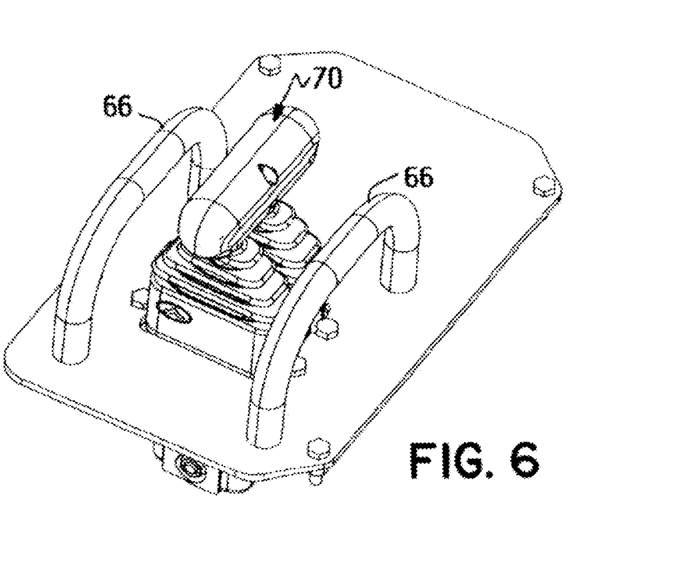
FIG. 6 is a perspective view of the traction control levers and the unifying hand grip portion of the loader of FIG. 1, particularly illustrating the unifying hand grip in an assembled condition atop the traction control levers.

This invention further provides a unifying hand grip 70 that sits atop levers 62 and effectively unites levers 62 when hand grip 70 is installed. As shown in FIG. 7, hand grip 70 is provided in two halves 72 that may be separated from one another for installation of hand grip 70. Various threaded screws 74 are provided for allowing halves 72 to be joined to another. When halves 72 are installed around the front and rear sides of knobs 64 of levers 62 such that the parting lines of halves 72 are abutted with one another, screws 74 may be installed and tightened to finish the installation of hand grip 70 atop levers 62. The installed hand grip 70 is shown in FIG. 6.

Figure 8:
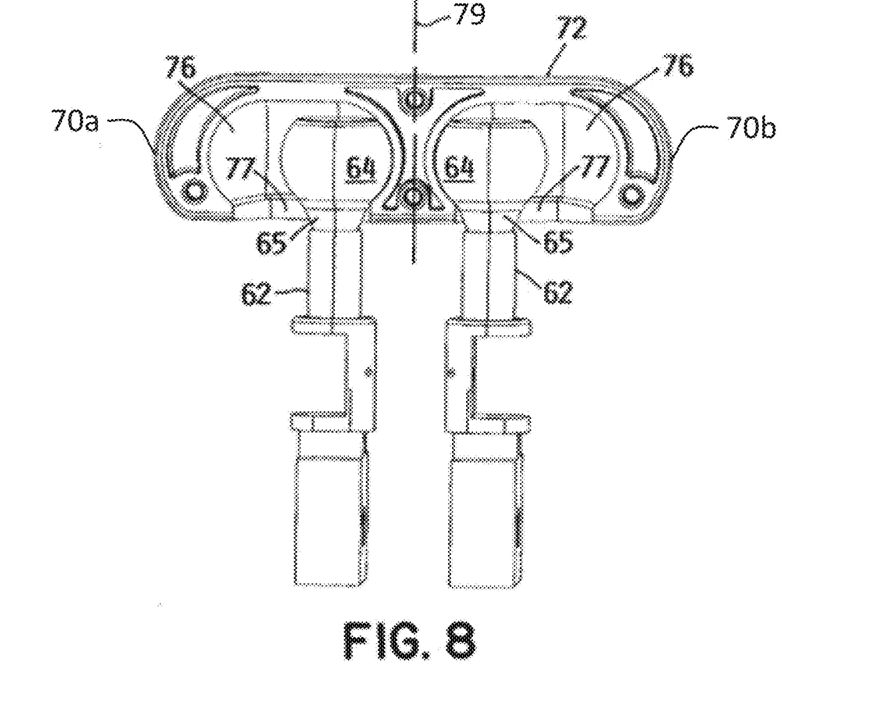
FIG. 8 is a side elevation view of one of the halves of the hand grip in engagement with the spherical balls or knobs of the traction control levers, particularly illustrating the slots on either side of the hand grip which receive the knobs of the traction control levers.
Figure 9:
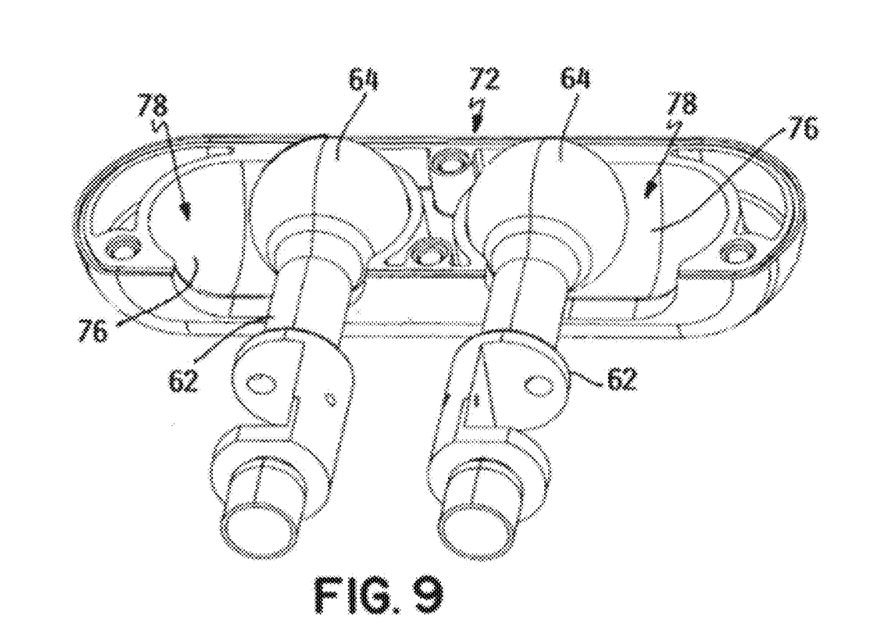
FIG. 9 is a perspective view of what is shown in FIG. 8.

Referring now to FIGS. 8 and 9, halves 72 define two laterally extending slot halves 76 on either side of the centerline 79 of the hand grip 70, which is shown as extending between free ends 70a, 70b. When halves 72 are united together, slot halves 76 form laterally extending slots 78 on either side of hand grip centerline 79. The front and rear sides of slots 78 are curved to mate with the spherical curvature of the front and rear sides of knobs 64 of levers 62. Once assembled, knobs 64 of levers 62 are received in slots 78 but cannot be pulled downwardly out of slots 78 as the spherical shapes of knobs 64 are larger than the bottom openings of slots 78 through which the very lowermost portions of knobs 64 extend. Thus, once halves 72 are assembled around knobs 64 of levers 62, hand grip 70 formed thereby cannot be removed from knobs 64 except by disassembling the same into halves 72 thereof.

Figure 10:
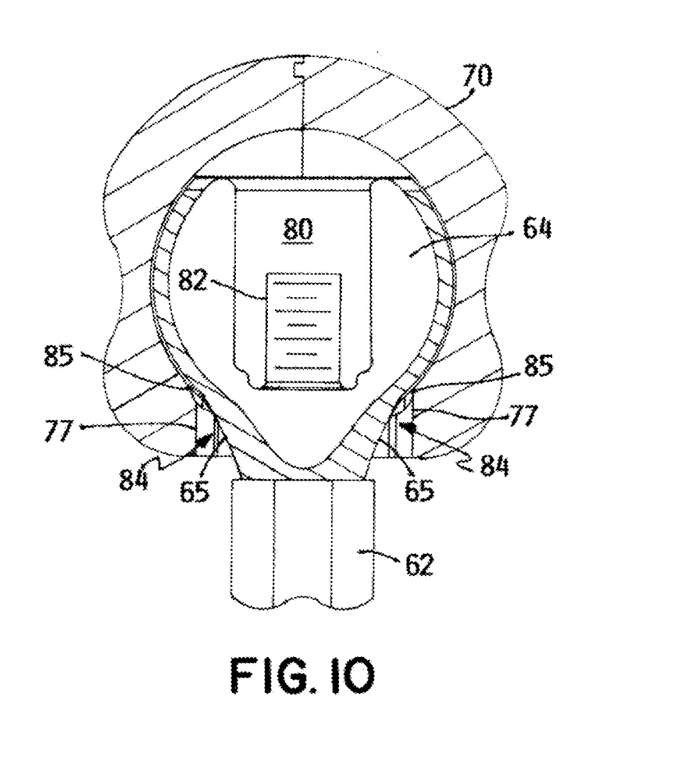
FIG. 10 is a cross-sectional side elevation view of the slot configuration in the hand grip as it is received on the knob of one of the traction control levers.

As shown in FIG. 10, the top of each knob 64 is cut away or truncated to expose a hollow central cavity 80 of knob 64 to allow knob 64 to be attached to a threaded upper end 82 of its corresponding lever 62. A nut (not shown) is received on threaded upper end 82 and screwed downwardly to secure knob 64 to lever 62. Preferably, the nut bottoms out in cavity 80 at a point at which knob 64 has no substantial vertical movement relative to lever 62 but before knob 64 is immovably or completely clamped or tightened to lever 62. Some degree of relative rotation or spinning of knob 64 atop lever 62 is preferred since such relative rotary motion has been found to reduce friction and wear as knob 64 traverses the length of slot 78 in which it is received with the caveat that knob 64 should not be so loose atop lever 62 that it moves up and down in any significant fashion on lever 62. While such relative rotary motion is preferred, knob 64 could be made fast with lever 62 so as to preclude such relative rotary motion if so desired.

In addition as further shown both in FIG. 8 and FIG. 10, while most of the surface of knob 64 is spherical in shape, the lower portion of knob 64 has a conical collar 65 leading to its bottom surface. This conical collar 65 is opposed by an approximately vertical wall 77 at the bottom of the front and rear sides of slot 78 which wall 77 is located below and cuts off the curved front and rear sides of slot 78 which match to the spherical portion of knob 64. Thus, a triangular gap 84 is located between the front and rear sides of slot 78 at the bottom thereof and the front and rear sides of conical collar 65. This triangular gap 84 has an apex 85 that forms a relatively sharp break or line of contact between conical collar 65 and walls 77 that ensures that hand grip 70 will not rock back and forth atop knobs 64 when it is pushed straight forwardly or pulled back straight rearwardly for straight line forward or reverse travel. This helps hand grip 70 remain stable and firm atop knobs 64 without having a tendency to itself rotate around the spherical surfaces of knobs 64.

Hand grip 70 eases the task of manipulating levers 62. To go forwardly, the operator simply pushes forwardly on hand grip 70. To go rearwardly, the operator simply pulls back on hand grip 70. To steer to the left when traveling forwardly, the operator simply rotates or cocks his or her hand to the left to cause the right side of hand grip 70 to move forwardly and the left side of hand grip 70 to move rearwardly. This automatically creates the proper differential action between levers 62 to cause a left turn. Slots 78 in hand grip 70 permit hand grip 70 to slide and pivot as need be around knobs 64 of levers 62 to accommodate this hand grip twisting or cocking to one side or the other. Put another way, since levers 62 and their knobs 64 can only move fore and aft in straight lines, slots 78 are needed to effectively allow hand grip 70 to have lateral motion relative to knobs 64 when hand grip 70 is being used to execute turns.

Figure 11:
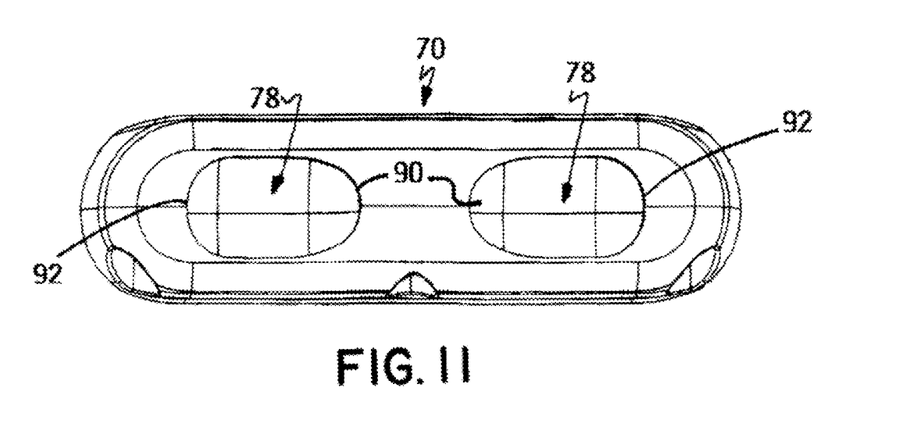
FIG. 11 is a bottom plan view of the hand grip showing the asymmetric shape of the laterally extending slots therein.
Figure 12:
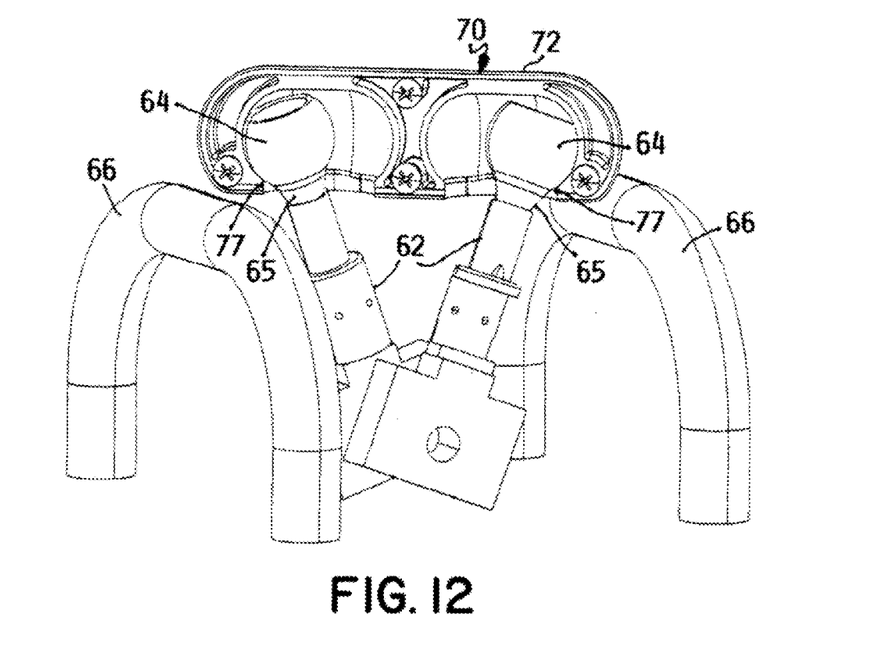
FIG. 12 is a perspective view of the hand grip being used to execute a spin or zero radius turn to the left with one half of the hand grip having been removed for the sake of clarity.
Figure 13:
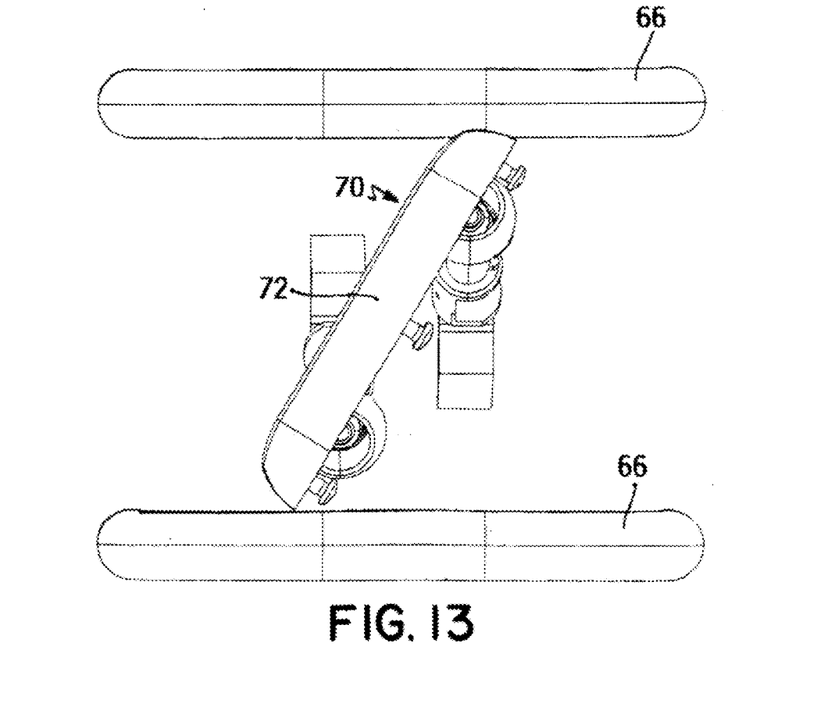
FIG. 13 is a top plan view of the hand grip as depicted in FIG. 12.

FIGS. 12 and 13 show hand grip 70 being used to execute a spin or zero radius turn towards the left. Hand grip 70 will have moved from the position shown in FIG. 9 where knobs 64 are located on the inner ends of slots 78 in each side of hand grip 70 to the positions shown in FIGS. 12 and 13 where knobs 64 will have moved to the outer ends of slots 78. Note in FIG. 12 that the same conical collar 65 and vertical wall 77 is used at the outer ends of slots 78 to allow knobs 64 to move into the outer ends of slots 78 without levers 62 being obstructed or hitting the outer ends of slots 78. As shown in FIG. 11, Applicants have found it useful to shape each slot 78 in an egg-shaped form where the inner end 90 of each slot 78 is somewhat smaller than the outer end 92 of each slot. The increase in size in outer end 92 of each slot 78 permits knobs 64 to more easily move the entire length of the slots when doing spin or zero radius turns without binding.

Using a hand grip 70 of the type shown in FIGS. 6-9 is far easier than trying to control both traction control levers with the fingers of the user's hand. Accordingly, hand grip 70 significantly increases the ease by which the operator is able to control the traction drive system of loader 2. This in turn increases safety and makes it less likely for the operator to have imprecise turns or to lose any steering control.

Various modifications of this invention will be apparent to those skilled in the art. For example, unifying hand grip 70 would be useful on outdoor work vehicles other than compact utility loaders as long as such work vehicles have a differential drive and steering system operated by dual traction control levers. Accordingly, the scope of this invention is to be limited only by the appended claims.

The invention claimed is:
1. A compact utility loader comprising:
 a) a frame extending along a longitudinal axis between a front end and a rear end;
 b) an outdoor maintenance or work implement operably supported by the frame;
 c) independent left and right traction drives located on opposite sides of the frame;

d) a foot platform, for supporting a standing operator, carried by the frame proximate the rear end; and e) a control console located proximate the frame rear end and generally forward of the foot platform, the control console including a handle assembly having a hand grip operable with one hand about a centerline axis and along a fore-and-aft axis, the fore-and-aft axis being laterally offset from the longitudinal axis, wherein the hand grip is connected to a lever assembly controlling operation of the left traction drive and the right traction drive, wherein the hand grip includes a first half-piece and a second half-piece secured together to capture an end of the lever assembly within the hand grip at a location between first and second free ends of the hand grip, wherein when the hand grip is in a neutral position, a length of the lever assembly extends generally orthogonally to a length of the hand grip, and wherein:

i) a forward motion of the hand grip along the fore-and-aft axis towards the frame front end causes the left and right traction drives to produce a forward motion of the compact utility loader;

ii) a rearward motion of the hand grip along the fore-and-aft axis away from the frame front end causes the left and right traction drives to produce a rearward motion of the compact utility loader; and iii) a twisting motion of the hand grip about the centerline axis, such that right and left sides of the hand grip are oppositely moved forwardly and rearwardly of the centerline axis, causes the left and right traction drives to produce a turning motion of the compact utility loader.

2. The compact utility loader of claim 1, wherein the lever assembly is pivotable about a rotational axis proximate an end of the lever assembly distal from the hand grip.

3. The compact utility loader of claim 2, wherein at least a portion of the end of the lever assembly is located forward of the rotational axis and moves vertically downward when the hand grip moves in the forward motion.

4. The compact utility loader of claim 1, wherein the lever assembly includes a first portion and a second portion, the second portion being rotatable with respect to the first portion about an axis extending along a length of the lever assembly.

5. The compact utility loader of claim 1, wherein the first half-piece has one or more protrusions extending into one or more recesses of the second half-piece.

6. The compact utility loader of claim 1, wherein the first half-piece and the second half-piece are secured together with fasteners.

7. The compact utility loader of claim 1, wherein the twisting motion of the hand grip in combination with the forward or rearward motion of the hand grip causes the left and right traction drives to produce a forward or rearward turning motion of the compact utility loader, respectively.

8. The compact utility loader of claim 1, wherein the twisting motion of the hand grip without a forward or rearward motion of the hand grip about the centerline axis causes the left and right traction drives to produce a zero radius turn of the compact utility loader.

9. The compact utility loader of claim 1, further comprising one or both of a first grab bar and a second grab bar, the first grab bar being mounted to a mounting surface of the control console at a location forward of the handle assembly, the second grab bar being mounted to the mounting surface of the control console at a location rearward of the handle assembly.

10. The compact utility loader of claim 1, wherein the compact utility loader includes a linkage assembly connecting the frame to the implement and is configured to substantially maintain a forward reach of the implement between uppermost and lowermost positions of the implement, and wherein the control console includes controls capable of being manipulated by the standing operator to operate the compact utility loader.

11. The compact utility loader of claim 1, wherein a portion of the lever assembly is covered by a boot.

12. The compact utility loader of claim 1, wherein a distal end of the lever assembly has an enlarged portion received between the first and second half-pieces.

13. The compact utility loader of claim 1, wherein the first half-piece and second half-piece are secured together along a joint line that extends in a direction that is parallel to the length of the lever assembly such that the first half-piece is located at a forward side of the lever assembly and the second half-piece is located at a rearward side of the lever assembly.

14. A control console for a compact utility loader, the control console comprising:

a) a mounting surface defining a longitudinal axis;

b) a first control, including a handle assembly, extending upwardly from the mounting surface on a first side of the longitudinal axis;

c) a second control extending upwardly from the mounting surface on a second side of the longitudinal axis such that the second control is laterally spaced from the first control; and d) a plurality of grab bars including one or both of a first grab bar and a second grab bar, and including a third grab bar, the first grab bar being mounted to the mounting surface of the control console at a location forward of the handle assembly, the second grab bar being mounted to the mounting surface of the control console at a location rearward of the handle assembly, the third grab bar being mounted to the mounting surface of the control console and being located rearwardly of the second control;

e) wherein the handle assembly has a hand grip cross member extending along a transverse axis between first and second free ends and is operable about a centerline axis and along a fore-and-aft axis, wherein the centerline axis is perpendicular to the transverse axis;

f) wherein the hand grip cross member is operable with one hand to move in a forward motion along the fore-and-aft axis, a rearward motion along the fore-and-aft axis, a twisting motion about the centerline axis, a combination of the forward and twisting motions, and a combination of the rearward and twisting motions.

15. The control console of claim 14, wherein a lever assembly extends between a first distal end and a second distal end, wherein the hand grip cross member is proximate the first distal end and the lever assembly is pivotable about a rotational axis proximate the second distal end.

16. The control console of claim 15, wherein at least a portion of the second distal end is located forward of the rotational axis and moves vertically downward when the hand grip cross member moves in the forward motion.

17. The control console of claim 14, wherein the hand grip cross member has a first free end and a second free end opposite the first free end.

18. The control console of claim 17, wherein the hand grip cross member is connected to a lever assembly at a location between the first and second free ends, wherein when the hand grip cross member is in a neutral position, the lever assembly extends generally orthogonally to a length of the hand grip cross member.

19. The control console of claim 18, wherein the lever assembly includes a first input member and a second input member.

20. The control console of claim 14, wherein the control console includes both of the first grab bar and the second grab bar.

21. The compact utility loader of claim 20, wherein an uppermost portion of the hand grip cross member is located beyond a maximum height of the first and second grab bars above the mounting surface.

22. The control console of claim 14, wherein the centerline axis is orthogonal to the fore-and-aft axis.

23. The control console of claim 14, wherein a front side and a rear side of the hand grip cross member each include a recess portion extending along a length of the hand grip cross member.

24. A compact utility loader comprising:
 a) a frame extending along a longitudinal axis between a front end and a rear end;
 b) an outdoor maintenance or work implement operably supported by the frame;
 c) a differential drive and steering system carried on the frame and including independent left and right traction drives located on opposite sides of the frame;
 d) a foot platform, for supporting a standing operator, carried by the frame proximate the rear end; and
 e) a control console located proximate the frame rear end and generally forward of the foot platform, the control console including a pivotable handle assembly, having opposite first and second free ends, that is operable with one hand along a fore-and-aft axis, the fore-and-aft axis being laterally offset from the longitudinal axis, the handle assembly defining a horizontal portion and a vertical portion, wherein a front side and a rear side of the horizontal portion of the handle assembly each include a recess portion extending along a length of the horizontal portion, the handle assembly being operable with:
  i) a first motion in which the first and second free ends are moved equally in a forward motion along the fore-and-aft axis towards the frame front end to cause the left and right traction drives to produce a straight forward motion of the compact utility loader;
  ii) a second motion in which the first and second free ends are moved equally in a rearward motion along the fore-and-aft axis towards the frame rear end to cause the left and right traction drives to produce a straight rearward motion of the compact utility loader; and
  iii) a third motion in which the first and second free ends are moved unequally in either or both the forward or rearward directions to cause the left and right traction drives to produce a turning motion of the compact utility loader.

25. The compact utility loader of claim 24, wherein the handle assembly comprises a lever assembly that is pivotable about a rotational axis proximate an end of the lever assembly distal from the first and second free ends.

26. The compact utility loader of claim 25, wherein at least a portion of the end of the lever assembly is located forward of the rotational axis and moves vertically downward when the first and second free ends move in the first motion.

27. The compact utility loader of claim 24, wherein the handle assembly includes a hand grip defining the first and second free ends and extending horizontally in a direction perpendicular to the longitudinal axis.

28. The compact utility loader of claim 27, wherein the handle assembly includes a lever assembly provided at a location between the first and second free ends, wherein when the horizontal hand grip is in a neutral position, the lever assembly extends generally orthogonally to a length of the hand grip.

29. The compact utility loader of claim 24, wherein the handle assembly has a T-shape.

30. The compact utility loader of claim 24, wherein the handle assembly comprises a lever assembly having a first input member controlling operation of the left traction drive and a second input member controlling operation of the right traction drive.

* * * * *